United States Patent
Medower et al.

(10) Patent No.: US 7,914,711 B2
(45) Date of Patent: Mar. 29, 2011

(54) USE OF MOTHER STAMPER FOR OPTICAL DISK MOLDING

(75) Inventors: Brian S. Medower, Boulder, CO (US); David L. Blankenbeckler, Longmont, CO (US)

(73) Assignee: DPHI Acquisitions, Inc., Longmont, CO (US)

( * ) Notice: Subject to any disclaimer, the term of this patent is extended or adjusted under 35 U.S.C. 154(b) by 1389 days.

(21) Appl. No.: 10/056,927

(22) Filed: Jan. 24, 2002

(65) Prior Publication Data

US 2003/0137065 A1 Jul. 24, 2003

(51) Int. Cl.
 *B29D 11/00* (2006.01)

(52) U.S. Cl. ............ 264/1.33; 264/1.31; 264/1.37; 264/2.5; 369/275.4; 430/321

(58) Field of Classification Search ............ 264/1.1, 264/1.31, 1.33, 1.37, 2.5; 369/116, 275.4; 430/320, 321
See application file for complete search history.

(56) References Cited

U.S. PATENT DOCUMENTS

| | | | | |
|---|---|---|---|---|
| 4,847,132 A * | 7/1989 | Takao et al. | ............ | 428/64.6 |
| 4,947,372 A * | 8/1990 | Koshino et al. | ............ | 365/106 |
| 4,960,680 A * | 10/1990 | Pan et al. | ............ | 430/270.13 |
| RE34,506 E * | 1/1994 | Dobbin et al. | ............ | 369/53.2 |
| 5,458,985 A * | 10/1995 | Isono et al. | ............ | 428/601 |
| 5,679,386 A * | 10/1997 | Murakami et al. | ............ | 425/175 |
| 5,736,657 A * | 4/1998 | Ide et al. | ............ | 75/230 |
| 6,190,838 B1 * | 2/2001 | Kerfeld | ............ | 430/320 |
| 6,207,247 B1 * | 3/2001 | Morita | ............ | 428/64.1 |
| 6,288,998 B1 * | 9/2001 | Taira | ............ | 369/275.4 |
| 6,335,912 B1 * | 1/2002 | Kobayashi et al. | ............ | 369/59.1 |
| 6,355,766 B1 * | 3/2002 | Mhetar | ............ | 528/196 |
| 6,440,333 B2 * | 8/2002 | Masuhara | ............ | 264/1.33 |
| 6,452,891 B1 * | 9/2002 | Hennessey | ............ | 369/116 |
| 6,630,082 B2 * | 10/2003 | Kuroda et al. | ............ | 264/1.33 |
| 6,656,392 B1 * | 12/2003 | Medower et al. | ............ | 264/1.33 |
| 2001/0016301 A1 * | 8/2001 | Edwards | ............ | 430/321 |
| 2001/0036149 A1 * | 11/2001 | Berg et al. | ............ | 369/290 |
| 2002/0021657 A1 * | 2/2002 | Lee et al. | ............ | 369/275.4 |
| 2002/0094405 A1 * | 7/2002 | Medower et al. | ............ | 428/64.4 |
| 2002/0101816 A1 * | 8/2002 | Braitberg et al. | ............ | 369/291 |
| 2002/0136984 A1 * | 9/2002 | Blankenbeckler et al. | ............ | 430/270.13 |
| 2003/0157292 A1 * | 8/2003 | Medower et al. | ............ | 428/64.4 |
| 2003/0161254 A1 * | 8/2003 | Blankenbeckler et al. | | 369/275.3 |
| 2003/0179688 A1 * | 9/2003 | Blankenbeckler et al. | | 369/275.3 |
| 2004/0037184 A1 * | 2/2004 | Moriya et al. | ............ | 369/47.24 |
| 2005/0089799 A1 * | 4/2005 | Otoba et al. | ............ | 430/270.11 |

FOREIGN PATENT DOCUMENTS

| | | | |
|---|---|---|---|
| JP | 3-24266 | * | 2/1991 |
| JP | 3-86943 | * | 4/1991 |
| JP | 3-97132 | * | 4/1991 |
| JP | 3-105739 | * | 5/1991 |
| JP | 3-283113 | * | 12/1991 |
| JP | 0 945 860 | * | 9/1999 |

* cited by examiner

*Primary Examiner* — Mark A Osele (74) *Attorney, Agent, or Firm* — Haynes & Boone, LLP.

(57) ABSTRACT

Optical disks are formed using mother stampers having a spiral groove and/or a spiral pattern of pits corresponding to the pattern from an original laser cut. The mother stamper is the mirror image of the corresponding father stamper. Injection molding of polycarbonate material or other suitable material using the mother stamper forms an optical disk having lands and bumps corresponding to the original laser cut. A phase-change material having constructive change in phase and thickness is deposited over the polycarbonate material to create the disk. Data is written to and read from the lands, and tracking is performed on the wobbled lands.

16 Claims, 4 Drawing Sheets

USE OF MOTHER STAMPER FOR OPTICAL DISK MOLDING

FIELD OF THE INVENTION

The present invention relates to optical disks, and more specifically, to manufacturing optical disks using mother stampers.

BACKGROUND OF THE INVENTION

Data storage disks, and in particular optical data storage disks, are widely used for a number of purposes, such as storage of pre-recorded or mastered information. As used herein, "mastered" information refers to information in which content is incorporated (embossed) onto the disk during the manufacture of the disk, typically in the form of a pattern of pits and planar regions. The information may include, for example, music recordings, movies, books, and other media. One common type of optical disk is a Compact Disk (CD), which pre-stores music recordings and allows the music to be played back by the consumer or user. Another common type of optical disk is a Digital Video Disk or Digital Versatile Disk (DVD), which pre-stores and plays back audio/visual media such as movies. Optical disks that contain mastered information are also sometimes referred to as read-only disks, indicating the ability to read or access the information, but not the ability to write information to the disk.

Other types of optical disks allow the user to write or store information onto the disk. These types of disks are sometimes referred to as write-once or read/write disks, which allow the user to both write information to and read information from the disk. Information can be written, for example, by downloading data via computer networks such as the Internet onto data storage disks. The downloaded data may include the same type of information as pre-recorded data, i.e., movies, music recordings, books, and other media.

In the prior art, information is typically stored on the mastered or read-only optical disk in the form of a sequential pattern of pits on the disk surface, indicating binary information. The detection of these pits is based on the principle of optical contrast detection. For example, the light from the laser is reflected off the pit and the planar region between the pits. The depth of the pits is such that constructive or destructive effects occur, creating an optical contrast between the pits and planar regions. Photodetectors at the optical head sense that optical difference and decode the information as a binary information transition, e.g., from 1 to 0 or from 0 to 1.

In read/write disks, the information is stored in the form of marks, usually in the grooves of the disk. Such marks can typically be a change in the nature of the material, such as in the structure of the material. Storing information or writing data onto the disk requires energy, typically in the form of laser light, to form the physical marks in the material. Typically, the marks are written on the groove.

The pits and grooves are formed on the disk using a father stamper, which has features (i.e., bumps and lands) that are mirror images or opposite polarity of the pits and grooves. Father stampers are formed, beginning with a glass master disk. Photoresist is deposited on the glass master disk. After being coated with photoresist, the master is placed on an air-bearing spindle. A master bench laser exposes selected portions of the photoresist to create the desired pattern of pits and/or grooves. After the photoresist is exposed and developed, which washes away the exposed resist to leave gaps and grooves, the master disk is plated with nickel in a process known as electroforming. The nickel mold, known as the father stamper, is separated from the photoresist and master disk. The father stamper has features that are mirror images of the features cut by the laser. Using polycarbonate, for example, in an injection molding process creates the disk with pits and recessed-grooves as originally cut by the laser.

The grooves are typically formed in a wobble that generates a sinusoidal signal used to control the rotational speed of the disk and to generate a clock signal. For example, U.S. Pat. Nos. 4,972,410 and 5,682,365 to Carasso et al. describes disks with wobbles and are incorporated by reference in their entirety. The grooves may also contain high-frequency wobble marks within the wobble which can be used to indicate other information, such as the addresses of the physical sectors. Details are disclosed in commonly-owned U.S. patent application Ser. No. 09/542,681, entitled "Structure and Method for Storing Data on Optical Discs", which is incorporated by reference in its entirety. In reading the disk, features cut by the original mastering laser are tracked. Thus, because disks created using a father stamper process have originally-cut features along the grooves, tracking is on the wobbled grooves, and information is written on the grooves.

Reading or playing back the information is typically achieved by the optical reader transmitting a light beam onto the information layer and detecting the characteristics of the reflected light. In the case of what are called front or first surface disks, the information surface is the first surface that the read or write laser impinges. To the contrary, in second surface disks, the information surface is the second surface that the read or write laser impinges, the first surface being the surface of the substrate. The stored information is read by detecting the absence or presence of the marks in the grooves of the coating layer, such as by an optical head or reader. This then allows the stored information to be played back. The detection principle for recorded information in such disks is often the change in the refractive indices of the coating layer. Another principle in such disks is the change in the polarization axis of the light.

Reading or playing back the information in second surface disks is typically achieved by the optical reader transmitting a light beam through the substrate of the disk and onto the information layer (i.e., the groove and pits) and reflecting the light beam back through the substrate. The substrate is typically a clear plastic material on which the information layer is formed. Because the light is incident on two surfaces (the substrate surface and the information surface), these type of disks can be referred to as second-surface or substrate-incident disks or media.

The relatively thick and transparent substrate of second-surface optical media makes read-only or read/write operations relatively insensitive to dust particles, scratches and the like since they can be located more than approximately 500 wavelengths from the information layer and hence are defocused. On the other hand, the second-surface optical medium can be relatively sensitive to various opto-mechanical variations. For example, common opto-mechanical variations include tilt of the substrate relative to the optical axis, substrate thickness variations, and/or substrate birefringence.

These variations give rise to optical aberrations which degrade system performance arising from the presence of the thick transparent layer and which can, at least theoretically, be partially compensated for by using a suitable optical path design. Such an optical path typically can only provide compensation for a single, pre-defined thickness of the layer. Because there are likely to be variations in the thickness or other properties of the transparent layer, such compensation may be less than desired at some locations of the medium.

Another drawback associated with second-surface optical media is that the optical requirements of such media are substantially inconsistent with the miniaturization of the disk drive and optical components for such media. As will be appreciated, a longer working distance (distance between the objective lens and the information content portions) is required for an optical system that will read information from or write information onto second-surface media. This is due to the relatively thick transparent layer through which the radiation must pass to access the recording layer. To provide the longer working distance, larger optical components (e.g., objective lenses) are required.

Accordingly, an optical disk is desired that overcomes the disadvantages discussed above with conventional optical disks.

SUMMARY OF THE INVENTION

In accordance with one aspect of the invention, an optical disk is manufactured using a mother or second generation stamper, in which information is stored on bumps and written to and read from raised lands (the portions closest to the read head or laser in a first surface disk). The mother stamper has features that are opposite in polarity to the father or a first generation stamper.

First a master is formed by using a laser to expose areas of photoresist on a master glass disk and then developing the photoresist to create recessed pits and grooves in areas exposed by the laser. Next, a metal coating is sputtered onto the photoresist layer, and a nickel stamper is formed over the recessed pits and grooves by an electroforming process. This nickel or father stamper thus has raised bumps and wobbled spiral protrusions corresponding to the original laser or mastering cut. Because this stamper is the first one formed from the master cut, father stampers can also be referred to as first generation stampers. The father stamper is then covered with nickel in a second electroforming process to form the mother stamper or a second generation stamper. After removal, the mother stamper has the same recessed pits and wobbled grooves as the original laser cut. The recessed pits will correspond to bumps in the eventual pre-recorded or ROM portions of the disk, while the recessed grooves will correspond to raised wobbled lands in the writeable or recordable portions. The mother stamper can now be used in an injection molding process, e.g., with polycarbonate, to form the optical storage disk of the present invention.

Since a mother stamper is the mirror image of the father stamper, e.g., protrusions of the father stamper are recesses of the mother stamper and vice versa, disks formed from mother stampers have lands and bumps that correspond to the original laser cuts in the photoresist of the master glass disk. Consequently, wobbles formed by the original laser cut are reproduced along the lands of the disk, which allows tracking of features of the original cut along the lands.

Further, in accordance with the invention, the data or information layer of optical disks formed from mother stampers are coated with a phase-change material having the property of a constructive physical and optical phase change when written to. Information is written to the phase-change material overlying the lands, instead of the grooves. The combination of the phase-change material and the grating effect created by the grooves and lands results in higher readback signal amplitudes (e.g., CNRs) when writing on the lands, as compared to writing on the grooves. This is due in part to the positive optical phase change between writing on lands and grooves. The positive phase change reduces the effective depth of the grooves when writing on lands, but increases the effective depth of the grooves when writing on grooves. Reducing the effective depth increases the reflectivity, resulting in a higher readback signal amplitude. Furthermore, the change in optical constants between crystalline (written-to) portions and amorphous (unwritten-to) portions adds to the reflectivity when writing to lands. This increased reflectivity due to change in optical constants also results in higher signal amplitudes.

In one embodiment, the phase-change material is in an amorphous state prior to writing. Once written to, such as with a laser, the written-to portion transitions to a crystalline state, which changes the optical phase. The change from amorphous to crystalline state, combined constructively with the grating effects, results in higher reflectivity and thus higher signal amplitude when writing to the lands. First surface recording for such a disk (i.e., a laser writes to and reads from the lands instead of the grooves) results in higher carrier-to-noise ratios (CNRs). Higher CNRs ultimately result in the capability to store more data in a given area.

The present invention will be more fully understood when taken in light of the following detailed description taken together with the accompanying drawings.

BRIEF DESCRIPTION OF THE DRAWINGS

Use of the same or similar reference numbers in different figures indicates same or like elements.

DESCRIPTION OF THE PREFERRED EMBODIMENTS

In accordance with one aspect of the present invention, an optical disk is manufactured using a mother stamper instead of a father stamper. The mother stamper is formed from a father stamper and is the mirror image of the father stamper.

The optical disk formed from the mother stamper has lands and bumps for storing information, and features are tracked along wobbled lands, which correspond to cuts made by the original mastering laser. A phase-change material having a constructive positive phase change when written to is used for the information layer.

Figure 1:
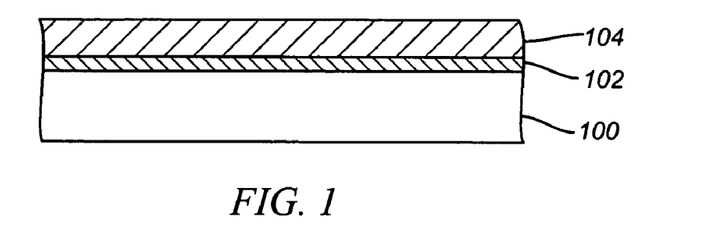
FIG. 1 is side view of a glass master coated with photoresist.

FIGS. 1-10 show how to make an optical storage disk according to one embodiment of the invention. In FIG. 1, a glass master disk (also referred to as a "master") 100 is coated with a film 102 to improve adhesion for a deposited layer of photoresist 104. Film 102 can be chrome, a saline coupling agent, or other suitable film. Photoresist 104 is typically a positive photoresist. Photoresist 104 is applied to master disk 100, such as through a spinning process, where the photoresist is placed in the center of the spinning disk, which causes the photoresist to centrifugally spread outward to coat the disk. The thickness of the photoresist corresponds to the height of the features of the disk to be formed. In one embodiment, photoresist is deposited to a thickness of between 20 nm and 120 nm, with a typical thickness of 85±5 nm. This typical thickness has been shown in one system, the Data-Play™ disk and engine, to provide acceptable overall system performance in areas such as reflectivity, resolution, and modulation depth. This thickness corresponds to the eventual height of the bumps and lands of the resulting optical disk. After photoresist 104 is deposited, the photoresist is cured, such as in an oven.

Master disk 100 is then transferred to a disk mastering machine, which includes components to rotate master 100 while being selectively exposed by a laser. Master 100 is rotated at a constant linear velocity, such as approximately 1.4 m/s. While rotated, the side of master disk 100 coated with photoresist 104 is exposed to a laser starting at an outer portion of the disk and spiraling inward toward the center. The properties of the photoresist are such that exposed portions react at the wavelength of the cutting laser. The laser is intermittent to expose portions of photoresist 104 that will be bumps in the optical disk, while skipping over portions between, forming a pattern that will be bumps and planar regions in the pre-recorded or ROM portions of the finished optical disk. The laser is continuous over portions that will be a spiral of lands in the writeable portions of the optical disk.

Figure 2A:
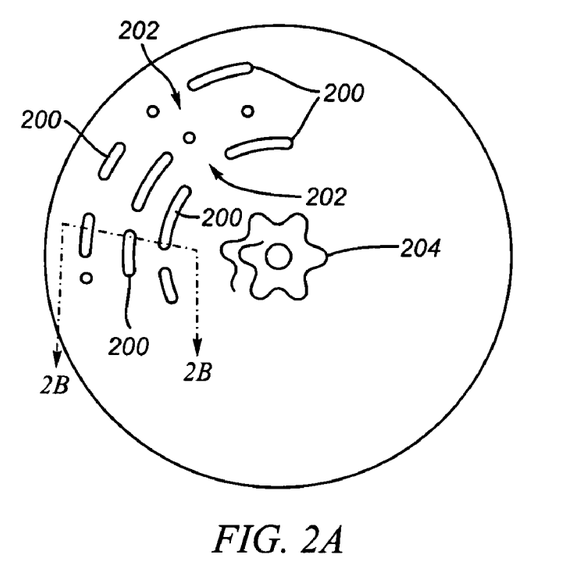
FIG. 2A is a top view of the master of FIG. 1 after laser exposure.
Figure 2B:
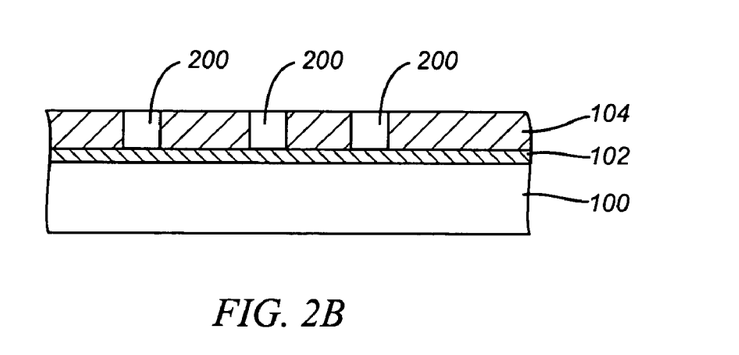
FIG. 2B is a side view of the master of FIG. 2A along sectional line 2-2.

FIGS. 2A and 2B show glass master disk 100 after being selectively exposed by the laser. FIG. 2A is a top view of master 100 showing exposed portions 200 that will eventually correspond to bumps in the resulting disk and unexposed portions 202 that will eventually correspond to planar regions between the bumps in the resulting disk. FIG. 2A also shows sinusoidal wobbles 204 cut by the laser, which will eventually correspond to raised wobbled lands in the completed disk. FIG. 2B is a side view along sectional line 2-2, showing exposed portions 200 of photoresist 104. It should be noted that although FIG. 2A shows portions that will correspond to both bumps (ROM portion) and lands (writeable portion), optical disks according to the invention can have all ROM portions on a side, all writeable portions on a side, or a combination of both. Such disks are described in commonly-owned U.S. patent application Ser. No. 09/764,042, entitled "First-Side Dual-Layer Optical Data Storage Disk and Method of Manufacturing the Same", filed Jan. 16, 2001, and Ser. No. 09/560,781, entitled "Miniature Optical Disk for Data Storage", filed Apr. 28, 2000, both of which are incorporated by reference in their entirety.

Figure 3:
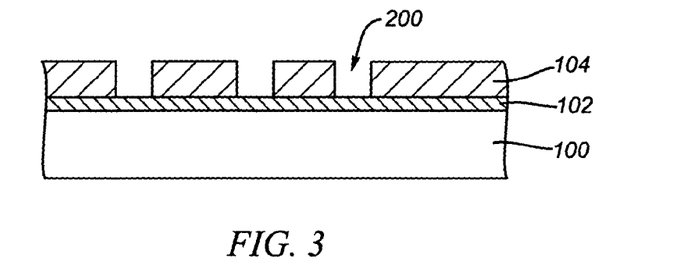
FIG. 3 is a side view of the master of FIG. 2B after photoresist development.
Figure 4:
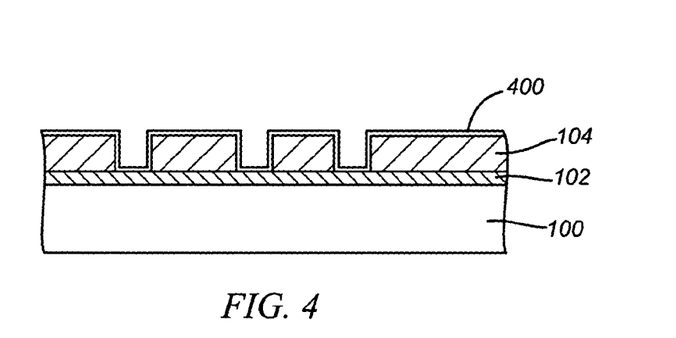
FIG. 4 is a side view of the master of FIG. 3 coated with a seed layer.

After exposing, photoresist 104 is developed, such as in an aqueous alkali solution by an automatic developing machine, to remove or etch the exposed portions 200 of photoresist 104, as shown in FIG. 3, to reveal recesses from the original laser cut. The depth of etch is monitored, and etching is typically stopped when the glass surface has been reached. The development step can also include multiple rinsing steps, such as with deionized water. Note that the recesses can be formed using a single laser ablation or other types of removal processes to replace separate laser exposure and photoresist removal steps. In FIG. 4, master 100 and photoresist 104 are then coated with a thin conductive or seed layer 400, e.g., silver, nickel, or gold, with a thickness between 1 nm and 10 nm and a typical thickness of 5 nm. This can be performed by sputtering in a vacuum chamber.

Figure 5:
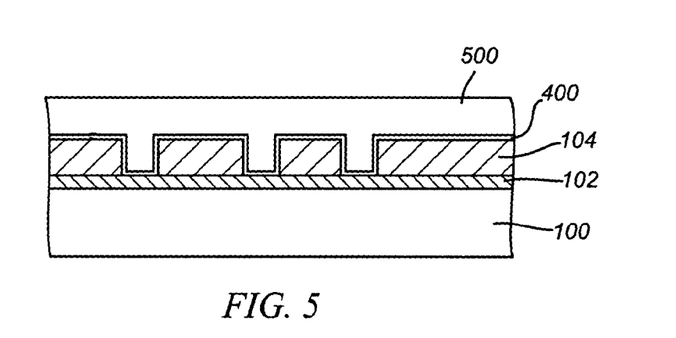
FIG. 5 is a side view of the master of FIG. 4 coated with nickel to form a father stamper.
Figure 6:
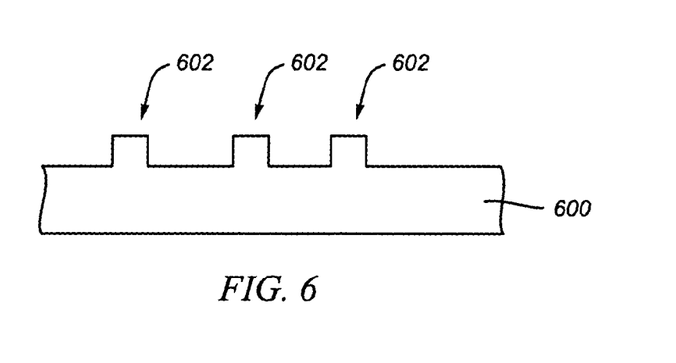
FIG. 6 is a side view of a father stamper formed according to one embodiment of the invention.

Next, master 100 is coated with nickel in an electroforming process to produce a father stamper. A father stamper can also be referred to as a "first generation" stamper because it is the first stamper produced from the master disk. Typically, master 100 is immersed in a nickel bath and connected to a cathode, with an anode of beads of nickel also in the nickel bath. Current is run through the bath, which causes nickel 500 to plate off and deposit onto master 100, as shown in FIG. 5. The master is then removed from the bath and the nickel plating removed from the master. The result is a father stamper 600, as shown in FIG. 6. Father stamper 600 is typically rinsed, such as with sodium hydroxide, to remove any residual photoresist particles. As seen, the original laser cuts to photoresist 104 correspond to protrusions 602 of father stamper 600.

Figure 7:
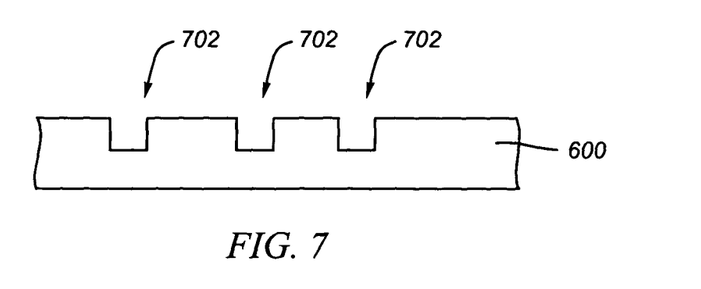
FIG. 7 is a side view of a mother stamper formed from the father stamper of FIG. 6.

Father stamper 600 can now be used to make a mirror image mother stamper 700, as shown in FIG. 7 using methods known to those skilled in the art. Mother stampers can also be referred to as second generation stampers since they are formed from father or first generation stampers. For example, father stamper 600 is submersed in a nickel electroforming bath (as described above), where nickel fills the features of the father stamper. A mother stamper is plated onto the father in a process similar to a father stamper being plated onto a master. After plating, the mother stamper is separated from the father stamper.

Note that mother stamper 700 has recesses 702 corresponding to protrusions 602 of father stamper 600. These recesses 702 correspond to the original laser cut, and therefore also follow the original wobble of the grooves. An operation is next performed on mother stamper 700, in which mother stamper 700 is trimmed to size, a center hole is punched through the center of the stamper, and the back side is polished to fit in the injection molding machine.

According to the present invention, an optical storage disk is made using mother stamper 700 in an injection molding process, instead of the father stamper as commonly used in the prior art. Note that other stampers that are mirror images of the father stamper can also be used to manufacture disks according to the invention. For example, if a third stamper was formed from the mother stamper, a fourth stamper formed from the third stamper will have the same polarity of features as the mother stamper (i.e., the mirror image of the father stamper) and thus can also be used to manufacture the disk. In general, all "even-numbered" generation stampers can be used according to the invention, where the first generation stamper is a father stamper and all "odd-numbered" stampers have the same feature polarity as the father stamper. Mother stamper 700 is fitted into an injection mold, which is injected with polycarbonate to form the optical disk, such as in commonly known DVD and optical disk manufacturing processes. The polycarbonate is first dried before injection in order to prevent bubbles from forming during the molding process. Note that plastics other than polycarbonate can also be used to form the optical disk.

Figure 8:
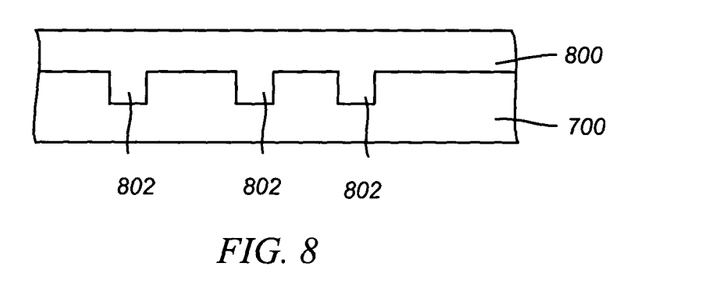
FIG. 8 is a side view of an optical disk formed from the mother stamper of FIG. 7.

FIG. 8 shows a polycarbonate disk 800 formed from mother stamper 700. The polycarbonate flows into and fills recesses 702 of mother stamper 700. Polycarbonate disk 800 is then separated from mother stamper 700, where disk 800 has bumps 802 and raised lands (not shown) corresponding to the original laser cut. Because the original laser cut creates sinusoidal wobbles when forming the original lands or grooves, the lands formed with the mother stamper reproduce the original wobbled cuts. It will be appreciated by those skilled in the art that the process described above can be used to simultaneously mold both sides of an optical disk, thereby avoiding the need for multiple sequential molding processes and subsequent lamination of two individual substrates.

Figure 9:
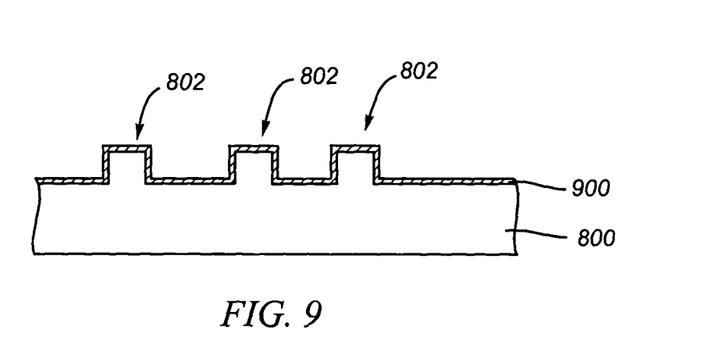
FIG. 9 is a side view of the optical disk of FIG. 8 coated with a phase-change material according to one embodiment of the invention.

In FIG. 9, a layer of phase-change recording material 900 is formed over polycarbonate disk 800, such as by physical vapor deposition (e.g., evaporation or DC or RF sputtering). In one embodiment, the thickness of phase-change recording material 900 is between 80 and 90 nm, with a typical thickness of 85 nm. An argon and oxygen gas is typically used as the sputtering gas. A temperature of approximately between 165° C. and 175° C. transitions the material from an amorphous to a crystalline state. Other properties of the phase-change layer are refractive indices with real parts n of 4.2±3% and 2.55±3% in the amorphous and crystalline states, respectfully, and imaginary parts k of 3.0±3% and 4.7±3% in the amorphous and crystalline states, respectfully.

Phase-change recording material 900 has properties such that the material is in a first state after formation on the substrate, but changes to a second state after it is written to, such as by a laser. In one embodiment, the material is in an amorphous state after deposition. However, once the laser impinges on the material at a high enough power to write (i.e., is written to), that portion is changed to a crystalline state having a higher reflectivity and a different optical phase or constants than the amorphous portions. One additional property is that the optical phase change is in the same direction as the physical change, i.e., constructive with respect to readback signal amplitudes. The differences between writing on the phase-change recording material over lands and over grooves is described in detail later. An example of a suitable material for phase-change recording material 900 is an SbInSn alloy (e.g., $Sb_{70}In_{15}Sn_{15}$) disclosed in U.S. Pat. No. 4,960,680 to Pan et al., which is incorporated by reference in its entirety. Using SbInSn for phase-change recording material 900, the deposited thickness ranges between 60 nm and 120 nm, with a typical thickness of 85 nm.

Figure 10:
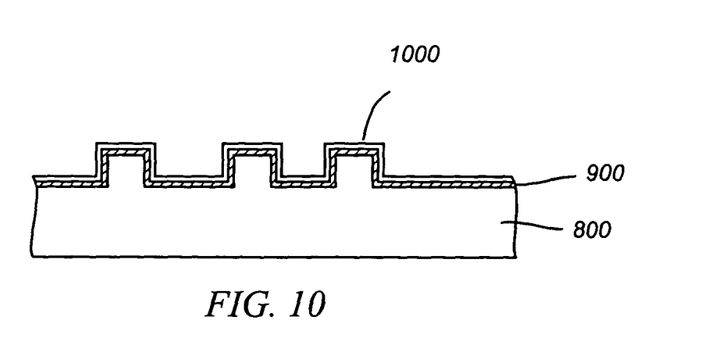
FIG. 10 is a side view of the optical disk of FIG. 9 coated with a protective layer.
Figure 11:
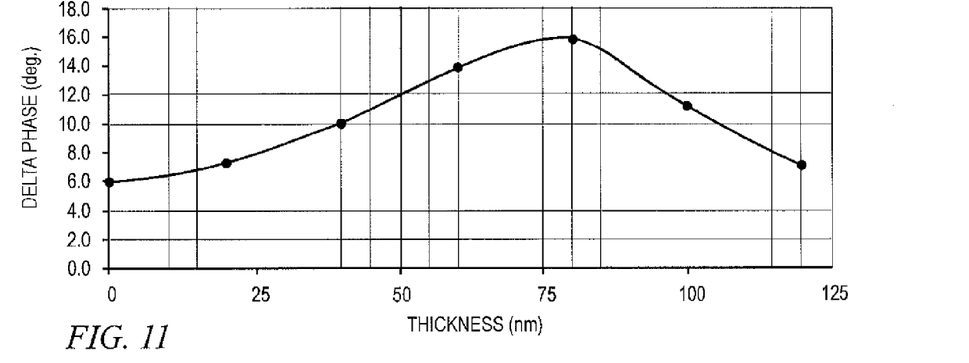
FIG. 11 is a plot showing the change in optical phase between crystalline and amorphous portions of the phase-change material as a function of the thickness of the protective layer.

In FIG. 10, a protective dielectric layer 1000 is deposited over the layer of phase-change recording material 900 or information layer. One type of protective dielectric layer 1000 is silicon oxynitride or $SiO_xN_y$, having a thickness between 40 nm and 80 nm, with a typical thickness of 60 nm for an index of refraction of 1.6. The index of refraction is tunable between 1.4 and 2.1. FIG. 11 is a plot showing the change in optical phase between the written-to (or crystalline) portions and the unwritten-to (or amorphous) portions as a function of the thickness of the dielectric layer. The thickness of the dielectric layer is varied, while maintaining a constant thickness of the underlying phase-change material layer. As seen from FIG. 11, the optical phase shift is always positive within the range of dielectric layer thicknesses.

Figure 12:
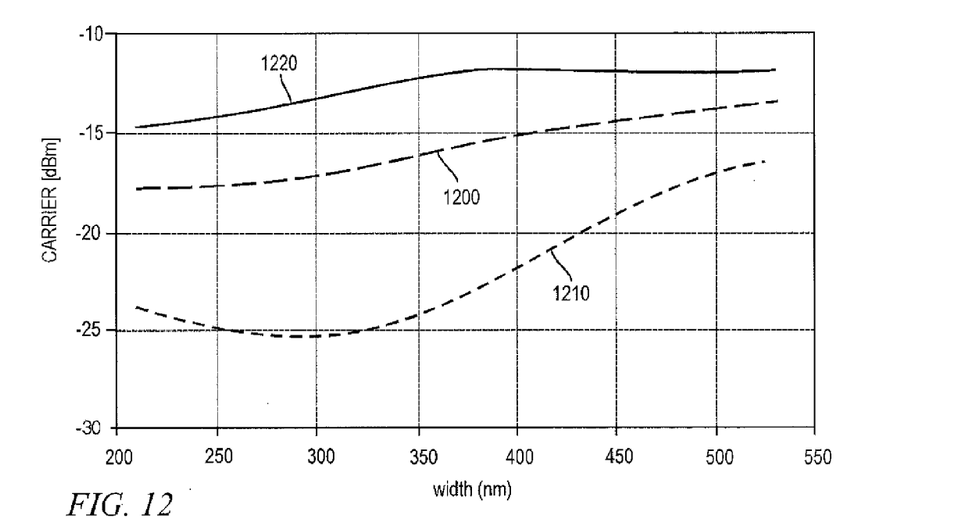
FIG. 12 is a plot showing the data signal amplitude as a function of the width of the groove or land when writing to the groove or land with and without phase shifts.

FIG. 12 is a plot showing the effects of the above-described positive phase change on data signal amplitude (in dBm) of a reflected read signal as a function of the width of the feature (groove or land). As will be described in more detail, this grating structure of grooves and lands combined with the phase-change recording material makes it desirable to write on the lands instead of the grooves.

The plot in FIG. 12 is for a fixed groove depth of 80 nm and read power of 0.35 mW. Long-dashed curve 1200 shows the signal amplitude when there is no optical phase shift between a written mark and an unwritten portion. As shown from curve 1200, writing to a groove and writing to a land exhibits no change in performance, i.e., both curves coincide. However, when there is a phase shift between written marks and unwritten portions, as shown by short-dashed curve 1210 and solid curve 1220, a significant difference in signal amplitudes exist when writing on grooves and on lands. Short-dashed curve 1210 shows signal levels when writing to grooves with a positive 12° phase shift between the written marks (crystalline portions) and unwritten portions (amorphous portions), resulting from the change in optical constants of the phase-change layer. Thus, writing to the grooves, where there is a positive phase shift from the unwritten to the written state, the signal amplitudes are no better than approximately −17 dBm. Furthermore, even to reach −17 dBm, the feature width, which in this case is the width of the groove, has to be greater than 500 nm. These size feature widths are not practical to manufacture.

On the other hand, if writing is to the lands, as shown by solid curve 1220, signal amplitudes are approximately 15 dBm higher than writing to the grooves. Even at feature widths wider than 500 nm, signal amplitudes, when writing to lands, are still approximately 4 dBm greater than when writing to grooves. This difference between writing to lands and grooves is attributed to the interaction between the grating structure and the optical constants of the recording layer.

Optical constants affect both the phase and amplitude of the reflected beam. The optical constants of the crystalline region result in an increased reflectivity amplitude with respect to the amorphous regions. Also, the change in optical constants between amorphous and crystalline regions is such that the optical phase difference is positive (i.e., the effective optical path length for light reflected from the crystalline region is greater than that for light reflected from the amorphous region). When writing on lands, this increase in phase reduces the diffractive power of the grating, thereby increasing the reflectivity of the crystalline regions further. Since both the amplitude and phase effects contribute to higher reflectivity in the crystalline regions, the net effect is an enhancement of signal when writing on lands.

When writing on grooves, the diffractive power of the grating is increased in the crystalline regions. This has the effect of reducing the reflectivity. Since the amplitude of the reflected light is still increased by the optical constants, the phase and amplitude effects tend to cancel one another, resulting in reduced readback signal amplitudes.

Figure 13:
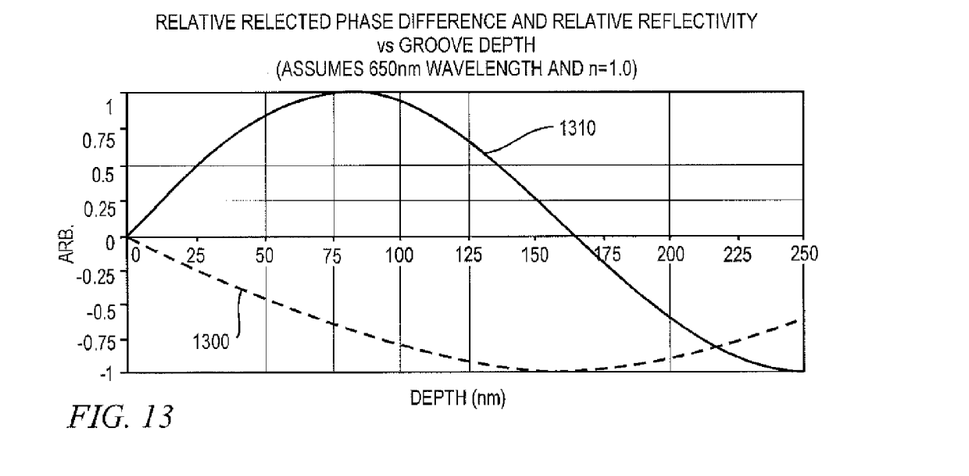
FIG. 13 is a plot showing the effect of groove depth on relative phase difference and reflectivity.

FIG. 13 is a plot showing the relative reflectivity and phase difference between land and groove as a function of groove depth. Dashed line 1300 shows the reflectivity, while solid line 1310 shows the relative phase difference. Note that FIG. 13, which illustrates the qualitative effects of groove depth, is shown in arbitrary units for the phase difference and reflectivity for a wavelength of 650 nm and an index of refraction of 1.0. In one embodiment, the groove depth is 85 nm, which, as seen from FIG. 13, provides the maximum relative phase difference between the groove and land. This is necessary to maximize the push-pull tracking signal. As the groove depth decreases, the relative reflectivity increases. However, as the groove depth increases from 85 nm, the relative reflectivity decreases until the groove depth reaches approximately 160 nm.

For an information layer or active layer of InSnSb and an overlying dielectric layer, as described above, the phase difference between the crystalline (written-to) and amorphous (unwritten-to) portions is always positive (see, e.g., FIG. 11) within practical active and dielectric layer thicknesses, e.g., approximately 100 nm for each layer. This positive phase difference corresponds to a longer optical path for the crystalline portions as compared to the amorphous portions. Thus, when writing to grooves, the depth of the groove appears deeper. However, when writing to lands, the depth of the groove appears shallower. Consequently, as seen in FIG. 13, writing to the lands results in higher reflectivity written marks than writing to the grooves.

Further, due to the differences in the optical constants for crystalline and amorphous portions, the reflectivity of crystalline portions is higher than the reflectivity of amorphous portions. Additionally, written-to portions contract as they transition from an amorphous to a crystalline state. This contraction contributes to the effects of the optical constants change. Phase-change material, such as an SbInSn alloy discussed above, is used for the information or data layer with optical disks formed using a mother stamper. When a portion of the phase-change material is written to, e.g., illuminated with a laser beam at sufficiently high power, that portion becomes recessed relative to the surface of the surrounding amorphous portions of the phase-change material. This physical depression corresponds to a positive optical phase shift.

For example, for an 85 nm thick amorphous layer, the written-to portion is recessed approximately 8 nm from the surface of the surrounding amorphous portions. This 8 nm depression corresponds to approximately a 9° optical phase shift at a wavelength of 650 nm. The positive 9° optical phase shift contributes to, as opposed to offsets, the phase shift due to the change in optical constants, which is also positive. Consequently, a relatively large positive phase shift occurs in the written-to portions of the phase-change layer. This reduces the effective depth of the groove when writing to lands, while increasing the effective depth of the groove when writing to grooves. It is noted that a phase-change material in which both contributions are to a negative phase shift can also be used. For example, one characteristic of such a material is that the written-to portions would need to expand or become protrusions between surrounding amorphous portions when writing in grooves.

Thus, from the above contributions, the total reflectivity of a crystalline mark when writing to lands is higher than when writing to grooves for disks formed according to the present invention.

The higher reflectivity when writing to lands translates advantageously to higher signal levels. The signal amplitude of the written mark depends on the difference of reflectivity between the amorphous and crystalline portions. The greater the difference, the higher the contrast, and the higher the signal amplitude. This difference of reflectivity can be expressed as a modulation depth M, where the signal amplitude is directly proportional to the modulation depth M. Equations 1 and 2 below are first order approximations for the modulation depths when writing on grooves and lands, respectively.

$$M\_groove = (Rx - \delta - Ra)/(Rx - \delta) = 1 - [Ra/(Rx - \delta)] \quad (1)$$

$$M\_land = (Rx + \delta - Ra)/(Rx + \delta) = 1 - [Ra/(Rx + \delta)] \quad (2)$$

Ra is the reflectivity of the amorphous portions, Rx is the reflectivity of the crystalline portions, and $\delta$ is the phase difference or shift between the amorphous and crystalline portions.

As seen from equations 1 and 2, when $\delta=0$ (i.e., no phase effects), the modulation depth is the same for the land and groove (i.e., M_land=M_groove). Thus, with no phase effects, there is no difference with respect to reflected signal strength when writing to lands or grooves. This is shown by long-dashed curve 1200 of FIG. 12, i.e., curve 1200 showing the signal amplitude when writing to lands and grooves is the same. However, when $\delta>0$ (i.e., there is a phase difference between the amorphous and crystalline portions), the modulation depth is greater when writing on lands than when writing on grooves (i.e., M_land>M_groove). Accordingly, the reflected signal amplitude is greater when writing on lands than on grooves. This is shown also in FIG. 12, where solid curve 1220 shows the signal amplitude when writing to lands is greater than the signal amplitude when writing to grooves shown by short-dashed curve 1210.

As a result, information is written to the lands in accordance with disks manufactured using mother stampers. Solid curve 1220 also shows that by a land width of approximately 400 nm, the signal amplitudes remain fairly constant. Accordingly, during manufacture of the disk, the lands are formed with widths of approximately 400 nm.

Furthermore, as discussed above, the lands have the same features as the original or mastering laser cuts. Features that are used for tracking must be the same as the ones cut by the original mastering beam. As a result, tracking is along the lands for disks made from mother stampers. Therefore, according to the present invention, disks formed using mother stampers and coated with phase-change material, as described above, allow read and write heads to read and track along the lands, which correspond to features of the original laser cut.

To summarize, an optical disk formed using mother stampers includes two types of areas, a ROM or pre-recorded portion containing bumps and adjacent spaces and a writeable or recordable portion containing spiral lands and grooves. The ROM portions contain a spiral track of bumps that are embossed onto the disk during manufacture, the bumps being separated by spaces; immediately following manufacture, the writeable portion contains only spiral grooves and lands, which are also embossed or molded onto the disk. The ROM portions do not need to contain lands because the track of embossed bumps can be used by the optical head for tracking purposes. In the writeable portions, the wobbled lands between the turns of the groove allow tracking during the reading or writing of information. The digital information in the writeable portion consists of crystalline marks in the otherwise amorphous active layer. The crystalline marks, which are analogous to the bumps in the ROM portions in that they contain the stored information, are formed on the lands.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

We claim:

1. A method of making a first-surface optical disk, comprising:

providing a father stamper, wherein the father stamper comprises spiral protrusions on a first portion of a first surface and bumps on a second portion of the first surface, the spiral protrusions and bumps corresponding to original laser cuts;

coating the first surface of the father stamper with nickel;

separating the nickel from the first surface to produce a second stamper having groove recesses and pits on a first surface, wherein the groove recesses are mirror images of the spiral protrusions and the pits are mirror images of the bumps;

covering the first surface of the second stamper with a plastic material;

separating the plastic material from the second stamper, wherein the plastic material has lands corresponding to the groove recesses of the second stamper and bumps corresponding to the pits;

depositing a phase-change material directly over the lands and bumps, wherein the phase-change material is in a first state upon deposition and in a second state after being written to, and wherein the change from the first state to the second state changes the optical phase of the phase-change material in the positive direction, the lands forming a writeable area of the first-surface disk and the bumps forming a read-only area of the first-surface disk; and depositing a dielectric layer over the phase-change material to form the first-surface optical disk, the dielectric layer being deposited to have a thickness that enhances an optical phase difference between the first and second states of the phase-change material, the first-surface optical disk consisting of no further layers.

2. The method of claim 1, wherein the covering comprises injecting the plastic material using an injection molding process.

3. The method of claim 1, wherein the phase-change material is an SbInSn alloy.

4. The method of claim 1, wherein the providing comprises: providing a glass master disk with a first and a second principle surface; depositing a photoresist layer on the first principle surface of the disk; removing selected portions of the photoresist layer; depositing nickel over the photoresist layer; and separating the nickel from the photoresist layer to form the father stamper.

5. The method of claim 4, wherein the removing is by laser ablation.

6. The method of claim 4, wherein the removing comprises: exposing the selected portions of the photoresist layer; and etching the selected portions.

7. The method of claim 6, wherein the exposing is performed with a laser and results in the original laser cuts in the photoresist layer.

8. The method of claim 4, further comprising rotating the glass master disk and exposing the selected portions with a laser prior to the etching.

9. The method of claim 4, wherein the deposited photoresist layer is between approximately 20 nm and 120 nm.

10. The method of claim 4, wherein the deposited photoresist layer is between approximately 80 and 90 nm.

11. The method of claim 1, wherein data is written to the lands from exposure by a light source.

12. The method of claim 1, wherein the dielectric layer comprises silicon oxynitride.

13. The method of claim 1, wherein the second stamper is a mother stamper.

14. The method of claim 1, wherein the father stamper is a first generation stamper, and the second stamper is an even-numbered generation stamper.

15. The method of claim 1, wherein the second stamper has features that are opposite in polarity to features of the father stamper.

16. The method of claim 1, wherein the plastic material is a polycarbonate material.

* * * * *